(12) United States Patent
Miyazaki et al.

(10) Patent No.: US 8,974,954 B2
(45) Date of Patent: Mar. 10, 2015

(54) BATTERY

(75) Inventors: Yasuhito Miyazaki, Yokosuka (JP); Takuya Kinoshita, Yokohama (JP); Takaaki Abe, Yokohama (JP); Yoshio Shimoida, Yokohama (JP)

(73) Assignee: Nissan Motor Co., Ltd., Yokohama-shi, Kanagawa (JP)

(*) Notice: Subject to any disclaimer, the term of this patent is extended or adjusted under 35 U.S.C. 154(b) by 373 days.

(21) Appl. No.: 13/392,949

(22) PCT Filed: Jul. 23, 2010

(86) PCT No.: PCT/JP2010/062460
§ 371 (c)(1),
(2), (4) Date: Feb. 28, 2012

(87) PCT Pub. No.: WO2011/027631
PCT Pub. Date: Mar. 10, 2011

(65) Prior Publication Data
US 2012/0156552 A1    Jun. 21, 2012

(30) Foreign Application Priority Data
Sep. 1, 2009    (JP) ................................. 2009-201983

(51) Int. Cl.
*H01M 2/06* (2006.01)
*H01M 2/26* (2006.01)
*H01M 2/22* (2006.01)
H01M 10/0525 (2010.01)
H01M 10/0585 (2010.01)

(52) U.S. Cl.
CPC *H01M 2/26* (2013.01); *H01M 2/22* (2013.01); H01M 10/0525 (2013.01); H01M 10/0585 (2013.01)
USPC .......................................... 429/179; 429/178

(58) Field of Classification Search
USPC .................................................. 429/178, 179
See application file for complete search history.

(56) References Cited

U.S. PATENT DOCUMENTS

| | | | | |
|---|---|---|---|---|
| 2009/0263709 | A1* | 10/2009 | Nakamura | 429/152 |
| 2009/0286150 | A1* | 11/2009 | Nelson et al. | 429/162 |
| 2010/0021810 | A1* | 1/2010 | Zhu et al. | 429/175 |

FOREIGN PATENT DOCUMENTS

| | | | |
|---|---|---|---|
| CN | 100521292 | C | 7/2009 |
| EP | 2043179 | A1 * | 4/2009 |
| JP | 2003-346798 | A | 12/2003 |
| JP | 2004-087260 | A | 3/2004 |
| JP | 2005-063775 | A | 3/2005 |

(Continued)

*Primary Examiner* — Jonathan Jelsma
*Assistant Examiner* — Rashid Alam
(74) *Attorney, Agent, or Firm* — Young Basile

(57) ABSTRACT

Disclosed is a battery having an improved life. Specifically disclosed is a battery which comprises an electric power generating element in which one or more unit cell layers are stacked, each being constituted by sequentially laminating or stacking a positive electrode, an electrolyte and a negative electrode; a first collector plate which is provided on the outermost positive electrode surface of the electric power generating element; a second collector plate which is provided on the outermost negative electrode surface of the electric power generating element; a convex or protruding portion provided on the first collector plate and/or the second collector plate with a width that is not less than a half of the width of the end edge of the collector plate; and a terminal which is attached to the convex portion for retrieving electric current from the convex portion.

17 Claims, 6 Drawing Sheets

(56) References Cited

FOREIGN PATENT DOCUMENTS

| JP | 2005122923 A | 5/2005 |
| JP | 2006-147534 A | 6/2006 |
| JP | 2007-188747 A | 7/2007 |

* cited by examiner

BATTERY

CROSS REFERENCE TO RELATED APPLICATION

This application claims priority to Japanese Patent Application No. 2009-201983 filed on Sep. 1, 2009 and incorporated herein by reference in its entirety.

TECHNICAL FIELD

The present invention relates generally to a battery and battery components.

BACKGROUND

A conventional battery is disclosed in Japanese Laid-open Patent Application No. 2005-63775 that has at least one electricity power generating element stacked, in each of which a positive electrode, an electrolyte, and a negative electrode are stacked in series. The battery has current collector plates at both ends of the stacking direction. Each collector plate has, on its surface, attached a tab for extracting power at a portion of outer periphery of the current collector plate.

SUMMARY

However, historically, to retrieve a power generated by a battery, a tab of shorter side length is provided than that of the current collector plate, thus resulting in a structure with a small junction area such that a current is likely to concentrate on the junction or connection area. In contrast, at the areas of the current collector plate not connected to the tab, there is no sufficient flow of current. Therefore, between the tab connecting area and the other areas, a substantial difference in current density is present and a steep change in voltage occurs. This change in voltage in turn affects electrodes within the internal of the power generating element and may cause a difference in the rate of deterioration over time within the same electrode, and may reduce the battery life. One of the objects of the present invention is to provide a battery of an improved battery life.

For achieving the above object, the present invention is provided with an electricity power generating element, a first collector plate, a second collector plate, a convex or protruding portion of conductive material, and a terminal. The power generating element has at least one unit battery cell layer stacked in series, each of the unit battery cell layer in turn is composed by stacking a positive electrode, an electrolyte, and a negative electrode.

A first collector plate is provided on the surface of positive electrode positioned outermost of the power generating element, while a second collector plate is provided on the surface of negative electrode positioned outermost of the power generating element. A convex or protruding portion or part made of conductive material is formed on at least one side of the first and second collector plates and has a width of not less than a half of the width of the end edge of the collector plate. The terminal is provided at the convex portion and retrieves current from the convex or protruding part.

The battery according to the present invention is provided with a convex portion whose width is larger than a half of the end edge of the current collector to extract electricity by connecting a terminal to the convex portion. Thus, a large connecting area between the collector plate and the convex portion is secured and a concentration of current may be alleviated. Therefore, a reduction of voltage gradient due to a difference in current density may be achieved, and as a result, a difference in deterioration speed of electrode may be suppressed for an improved battery life.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
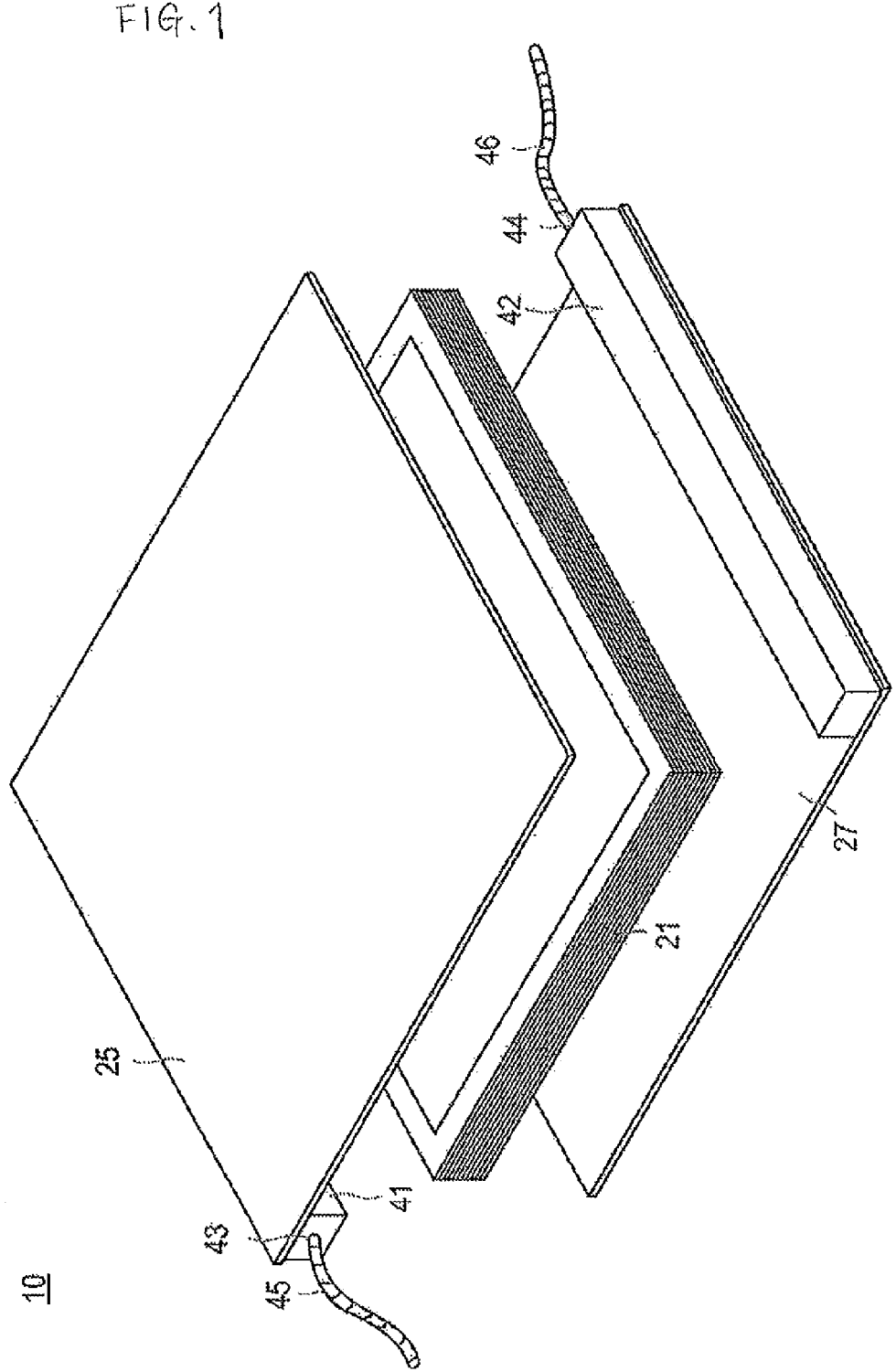
FIG. 1 is a perspective view schematically representing the configuration of a bipolar secondary battery.

Description will now be made below with reference to the accompanying drawings of the embodiments of the present invention. Incidentally, to the same elements in the drawings the same reference numerals are accorded, to omit redundant descriptions. Regarding the proportions of respective elements in the drawings, an exaggeration may be made for convenience of explanation, and the proportion illustrated may be different from an actual one.

First, although a bipolar type lithium ion secondary battery (bipolar secondary battery) will be described as a preferred embodiment, no restriction is made to that described in the following embodiment. Namely, the present invention may equally be applicable to batteries of the type other than a bipolar secondary battery.

Figure 2:
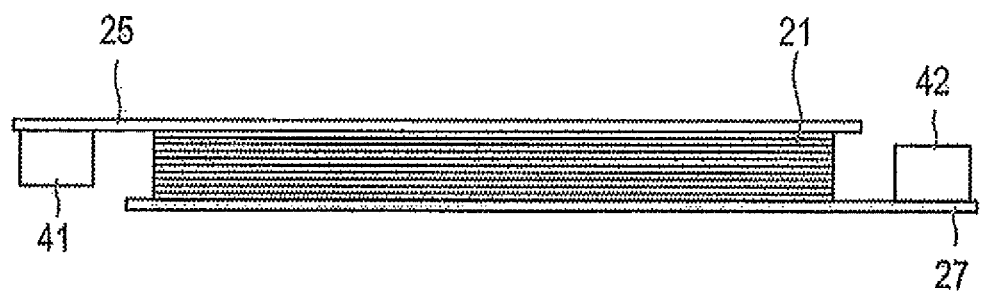
FIG. 2 is a sectional view of a bipolar secondary battery.

FIG. 1 is a perspective view schematically representing the configuration of a bipolar secondary battery 10. FIG. 2 is a cross-sectional view of a bipolar secondary battery 10 of FIG. 1.

As shown in FIG. 1 and FIG. 2, the bipolar secondary battery 10 is structured such that it has a first current collector plate 25 and a second current collector plate 27 on both ends of the power generating element 21 which has a substantially rectangular shape and causes a charge and discharge reaction inside. One of both end surfaces of the power generating element 21 is assigned to a positive electrode while the other end surface is for a negative electrode. On the surface of the positive electrode the first current collector plate 25 is provided and paired, whereas on the surface of the negative electrode, a second current collector plate 27 is provided and paired respectively. This paring may be interchangeable, however.

At least on one of the first current collector plate 25 and the second current collector plate 27 is provided a bar member or portion (convex portion) 41, 42. In the embodiment that follows, explanations will be made for an arrangement in which on both of the first current collector and second current collector are provided with a bar, i.e., a first bar element 41 and second bar element 42, respectively.

Both the first bar 41 and second bar 42 have a width of not less than a half of that of the end edge of the first current collector plate 25 and the second current collector plate 27, respectively, and both bars protrude to the side of power generating element 21. In the embodiment below, explanations will be made for the arrangement in which both the first bar 41 and second bar 42 have the same width of end edges of the first and the second current collector plates 25, 27.

At the one end of the first bar 41 in the elongate or axial direction is provided with a terminal 43 for retrieving current generated in bipolar secondary battery 10. Similarly, at second bar 42, the other terminal 44 is provided for retrieving current. Here, needless to say, by using the terminal to retrieve the electricity, it is possible to charge the bipolar secondary battery as well.

In addition, terminals 43, 44 of first bar 41 and second bar 42 are connected to conductive lines 45, 46, power line, bus bar, or leads for charge and discharge operations there through. Moreover, by using conductive lines 45, 46, power line, bus bar, leads, a serial or parallel connection with an adjacent bipolar secondary battery, a battery assembly pack for supplying a required voltage/current specifications will be configured.

Furthermore, a bipolar secondary battery 10 may be manufactured by the process known in the art.

Below, a description of each member constituting the bipolar secondary battery 10 will be made for an example of the bipolar lithium ion secondary battery to show how the invention may be employed. However, the types of active material, electrolyte, current collector plate, current collector, binder, supporting salt (lithium salt), and selection of compounds to be added as needed is not particularly limited. Depending on the intended use, details may be determined suitably by referring to conventionally known knowledge.

Figure 3:
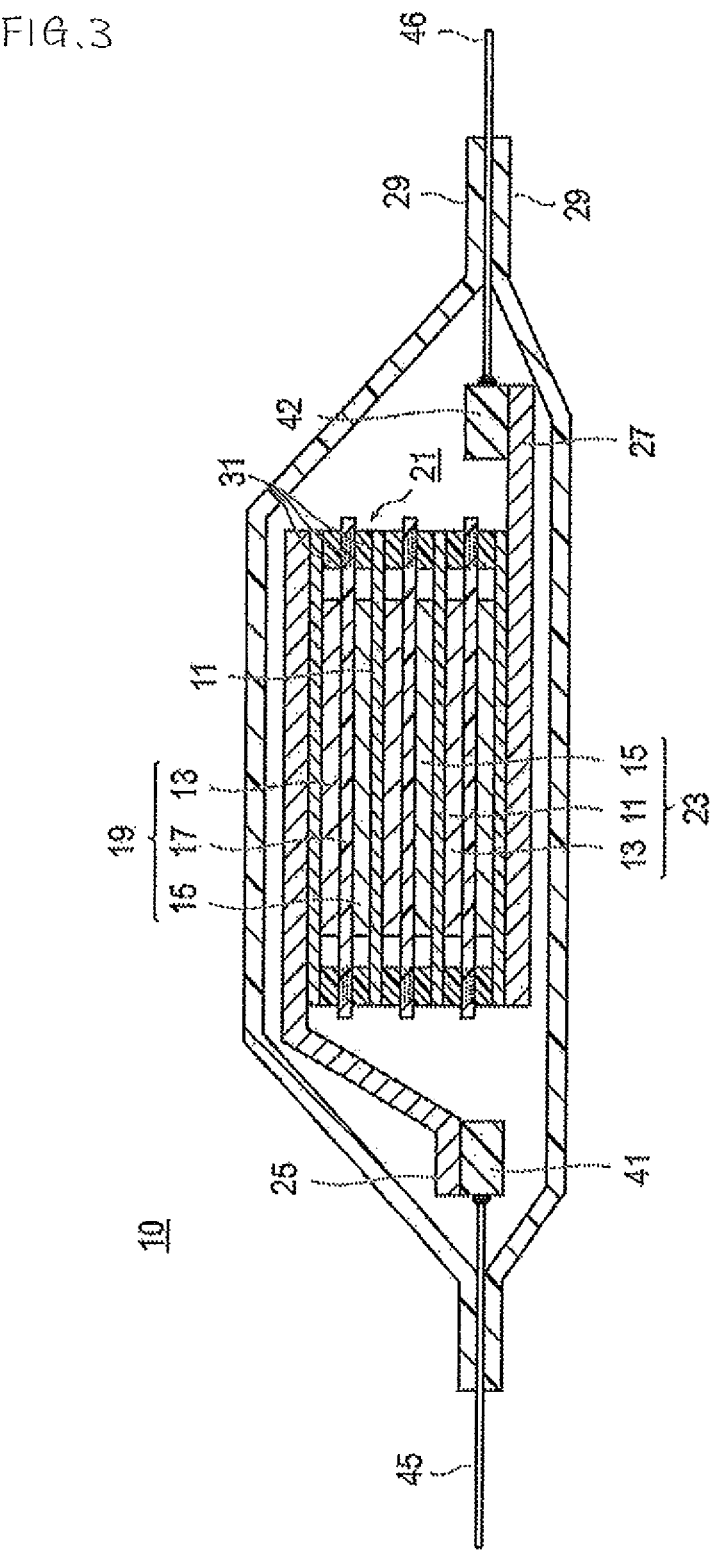
FIG. 3 is a schematic sectional view showing the structure of a power generating element of a bipolar rechargeable battery.

FIG. 3 is a schematic sectional view showing the structure of the power generating element 21 of the bipolar secondary battery 10.

As shown in FIG. 3, the power generating element 21 is structured by stacking a unit battery cell layer 19 composed of by stacking a positive electrode 13, an electrolyte layer 17, and a negative electrode 15 with current collector interposed there between. The number of stacking layers may be determinable based on the current/voltage required from the bipolar secondary battery 10. Also, in FIG. 3, the power generating element 21 is structured to stack a plurality of unit cells with a current collector 11 interposed. However, a single cell 19 may well work as the power generating element 21. A bipolar electrode 23 is composed of a positive electrode 13, current collector 11 and negative electrode 15 stacked in this order.

A positive electrode 13 and a negative electrode 15 have a positive electrode active material layer 15 and a negative active material layer 13, respectively, and each comprises an active material, and when necessary, further includes other additives.

Examples of positive electrode active material layer 13 may include lithium-transition metal composite oxides such as $LiMn_2O_4$, $LiCoO_2$, $LiNiO_2$, $Li(Ni-Co-Mn)O_2$ and compound in which a part of these transition metals is substituted by other element, such as lithium-transition metal phosphate compounds, and lithium-transition metal sulfate compounds.

In some cases, two or more positive electrode active materials may be used in combination. Preferably, in terms of the capacity and output characteristics, lithium-transition metal composite oxide is used as the positive electrode active material. It should be noted that other positive electrode active materials than those described above may also be used.

Examples of the negative electrode active material layer 15 are carbon materials such graphite, soft carbon and hard carbon, lithium-transition metal composite oxide such as $Li_4Ti_5O_{12}$, metal materials and lithium alloy negative electrode materials. In some cases, two or more kinds of negative electrode active materials may be used in combination. In terms of capacity and output characteristics, however, the carbon materials or the lithium-transition metal composite oxides are preferred as the negative electrode active material. It is needless to say that any other negative electrode active materials can suitably be used.

The positive electrode active material layer 13 and the negative electrode active material layer 15 may also contain a binder such as polyvinylidene fluoride, polyimide, styrene butadiene rubber, carboxymethylcellulose, polypropylene, polytetrafluoroethylene, polyacrylonitrile, and polyamide. These binders are excellent in heat resistance and have a large potential window so as to remain stable in a wide range of positive and negative electrode potentials for suitable use in the active material layers. These binders may be used alone or in combination of two or more thereof. In addition, other additives may be included in the active material layer, such as conductive aids, electrolytic salt (lithium salt), ion-conducting polymers and the like.

The thickness of the positive electrode 13 is not particularly limited, as noted for the blending amount, and should be determined considering the intended use of the battery (output oriented or more focus on energy etc.,), and ionic conductivity. The typical thickness of a positive active material layer ranges between about 10 and 500 μm.

The negative electrode 15 is essentially similar to those explained with regard to the positive electrode material except for the type of negative electrode active material. The detailed description is therefore omitted here.

As the electrolyte constituting the electrolyte layer 17, a liquid electrolyte or a polymer electrolyte may be used.

The liquid electrolyte is in the form of a solution in which a lithium salt (support salt) is dissolved in an organic solvent (plasticizer). Examples of the organic solvent usable as the plasticizer are carbonates such as ethylene carbonate (EC), propylene carbonate (PC). Examples of the lithium salt usable as the support salt are LiBETI and the like compounds which can be added to electrode active material layers.

On the other hand, the polymer electrolyte can be classified into a gel electrolyte containing therein an electrolyte solution and an intrinsic (all-solid-state) polymer electrolyte containing no such electrolyte solution.

The gel polymer is in the form of a gel in which the above mentioned liquid electrolyte is impregnated into a matrix polymer composed of an ion conductive polymer. Examples of the ion conductive polymers as matrix polymer are polyethylene oxide (PEO), polypropylene oxide (PPO), and copolymers thereof. In these polyalkyleneoxy polymers, electrolyte salts such as lithium salt may be easily dissolved.

When the electrolyte layers may be formed by a liquid electrolyte or gel electrolyte, a separator may be used in the electrolyte layer. Examples of the separators are porous films of polyolefins such as polyethylene and polypropylene.

The intrinsic polymer electrolyte may be in the form of a matrix polymer dissolving therein the support salt (lithium salt) but not containing the organic solvent (plasticizer). Thus, the use of such an intrinsic polymer electrolyte may prevent a liquid leakage from the battery and may improve the reliability of the battery.

The matrix polymer of the gel electrolyte or intrinsic polymer electrolyte forms a cross-linking structure to provide an improved mechanical strength. In order to form such a cross-linking structure, it is conceivable to subject the polymerizable material (such as PEO or PPO) of the polymer electrolyte to any polymerization reaction such as thermal polymerization, ultraviolet polymerization, radiation induced polymerization or electron-beam induced polymerization by the use of any appropriate polymerization initiator.

The thickness of the electrolyte layer 17 is not particularly limited. However, in order to obtain a compact bipolar cell, the thickness should preferably be kept as thin as possible as long as the functions as an electrolyte are assured. The thickness of a typical solid polymer electrolyte layer is about 10 to 100 μm.

The material of the current collector 11 is composed of a conductive material serving as a joining member for electrically connecting the active material layer 13, 15 to the outside. As far as having a conductive property, no limitations will be posed on selection of concrete material, structure and the like regarding the current collector 11, and known structure/property can be employed as used in a conventional lithium ion secondary battery. For example, a metal or conductive polymer can be employed—in terms of ease of retrieval of electricity, preferably metallic material is used. More specifically, for example, at least one current collector material which is selected from the group consisting of iron, chromium, nickel, manganese, titanium, molybdenum, vanadium, niobium, aluminum, copper, silver, gold, platinum and carbon and the like is exemplified. More preferably, at least one current collector material which is selected from the group consisting aluminum, titanium, copper, nickel, silver, or stainless steel (SUS) may be an example. These may have a single-layer structure (for example, in the form of foil), or may be realized in a multilayer structure consisting of layers of different types. In addition, a nickel-aluminum clad material, a copper-aluminum clad material and a plating material of any combination of these metals can preferably be used. Also, a metal may be employed with its surface coated with aluminum foil. In addition, a PTC (Positive Temperature Coefficient) element may be used in which a resistance increases rapidly when exceeding a predetermined temperature. Among these, in view of electron conductivity and cell operating potential, aluminum or copper is preferred. Also, in some cases, two or more of metal foil materials identified above as current collector materials may be formed in foil and bonded together. The above material is superior in corrosion resistance, electric conductivity, and workability.

Typical thickness of the current collector 11 is 1 to 50 μm. However, a current collector outside this range of thickness may be used. Also, the current collector 11 may be formed by foil, nonwoven fabric, or porous body.

An insulating section 31 is provided to prevent a liquid junction due to leakage of liquid electrolyte from the electrolyte layer 17. In addition, the insulating section 31 is expected to prevent contacting a current collector with adjacent one within a battery, or to prevent occurrence of a short circuit due to slight misalignments of the ends of the unit battery cell layers 19 in the power generating element 21.

As the material constituting the insulating section 31, such properties are required as insulating property, sealing property against dropping out of solid electrolyte layer, sealing property or performance against moisture permeation of moisture from outside, and heat resistance at battery operating temperature. For example, urethane resins, epoxy resins, polyethylene resins, polypropylene resins, polyimide resins, and rubber may be used. In particular, from the perspective of corrosion resistance, chemical resistance, ease of building (film productivity), and economic efficiency, polyethylene or polypropylene resins may preferably be used as a constituent material of the insulating portion 31.

The material for the first and the second current collector plates 25 and 27 is not particularly be limited, and various current collector materials may be used known as exhibiting high conductivity material for use for a conventional bipolar secondary battery such as metallic material including aluminum, copper, titanium, nickel, stainless steel (SUS), and alloys thereof, more preferably aluminum or copper in terms of lightweight, corrosion resistant, and highly conductive properties, and most preferably, aluminum. The first and the second current collector plates 25, 27 may be manufactured by spraying the above material to a substrate by inkjet technology, or may alternatively be formed by plating, coating, or laminating of a plurality of metal materials. In addition, the current collector may also include a resin.

The area of the first and the second current collector plates 25, 27 as viewed along the stacking direction is greater than the both end surface areas of the bipolar electrode 23 in power generating element 21. Therefore, stress can be applied uniformly over the first and the second current collector plates 25, 27.

The first current collector plate 25 is not mechanically fastened to the end current collector 11 but will be electrically connected to end current collector 11, by a metal contact caused by pressure when sealed by a cladding or battery package 29. Between positive first current collector plate 25 and the end current collector 11, coating agents of excellent conductivity with adhesive or non-adhesive property may be interposed. The same applies to the second current collector plate 27.

In addition, for the first and the second current collector plates 25, 27, the same material or different materials may be used. Moreover, the first and the second current collector plates 25 and 27 may be formed by extending the current collector 11 located at the outermost layer of the power generating element 21.

Bars (convex parts) 41 and 42 are provided at the partial or entire periphery of each first and second current collector plates 25, 27. In particular, it is preferable that bars 41, 42 may be provided on only one edge of the first and the second current collector plates 25 and 27, respectively. In addition, the bars 41 and 42 may preferably be positioned at opposite ends while surrounding the power generating element 21 as a center.

In addition, the surface on which bars 41 or 42 is provided is preferably on the same surface on which the power generating element 21 rests, i.e., on the side of the power generating element 21. However, bars 41, 42 may alternatively be provided on the opposite side from the power generating element 21.

The material of the bar 41 and 42 may be of metal or conductive polymer, for example. In terms of ease of retrieval of electricity, however, preferably metallic material is used. More specifically, for example, aluminum, nickel, iron, stainless steel, titanium, copper and other metals may be enumerated. In addition, an aluminum and nickel clad, a copper and aluminum clad and a plating material of a combination of these metals may preferably be used. Also, a bar with its surface coated with aluminum may also be an alternative.

The bar 41, 42, in particular the first bar 41 or second bar 42, has a width of not less than a half of the width of end edges of the first current collector plate 25 or the second current collector plate 27, and both bars protrude to the side of the power generating element 21.

A cross-sectional area of bars 41 and 42 is preferably not less than 0.04% of the area of the electrode. By doing so, it is possible to achieve the desired control accuracy of the non-aqueous secondary battery for use as a power source for driving an electrically driven vehicle. It should be noted here that the cross-sectional area of bars 41, 42 is defined as an area of cross section in a plane perpendicular to its axis (an elongate direction).

By providing terminals 43 and 44, respectively, on bars 41 and 42, current may be retrieved to outside of a battery. Terminals 43 and 44 can be located anywhere in at least one or more locations. In particular, the position of terminals 43 and 44 are preferably located in the farthest position from each other.

As the battery package 29, in addition to a known metal can, a bag shaped case employing a laminated film containing aluminum is acceptable. For example, an aluminum laminate film, e.g. a three-layer laminate film in which a PP layer, an aluminum layer and a nylon layer are laminated in this order, may be used. The battery package material is not limited to the above. Among the possible choices, the laminate film is preferred because of its high output and cooling characteristics and applicability to large-equipment batteries of electrically driven vehicle such as for an EV (Electric Vehicle) and a HEV (Hybrid Electric Vehicle). In FIG. 3, bars 41 and 42 are located within the interior of the battery package 29, although bars 41 and 42 may be positioned outside of the battery package 29.

As the conductive lines 45 and 46 for retrieving current outside of battery, power lines, leads and bus bars may also be used. Conductive line 45 or 46 is electrically connected to the outermost layer current collector or a collector plate and is led outside of the laminate sheet serving as a battery clad or package.

The material of conductive lines 45, 46 is not particularly restricted. Any known high-conductive material for use as conductive line in a bipolar lithium-ion secondary battery may be applied. Preferred examples of the conductive line material are metal materials such as aluminum, copper, titanium, nickel, stainless steel (SUS) and alloys thereof. In terms of light weight, corrosion resistance and high conductivity, however, aluminum and copper are more preferred. The conductive line material for conductive line 45 may be the same as or different from that for conductive line 46.

It is desirable to cover any parts led out of the battery package 29 with heat-resistant, heat-shrinkable insulating tubes or the like, in order to prevent a short circuit from occurring upon contact of these parts with peripheral equipment or wiring that would affect the performance of a product (for example, an automotive part, and an electronic equipment in particular).

To provide an operative aspect of the present embodiment, descriptions will now be made on a current collector mechanism to retrieve current from power generating element 21.

Figure 5A:
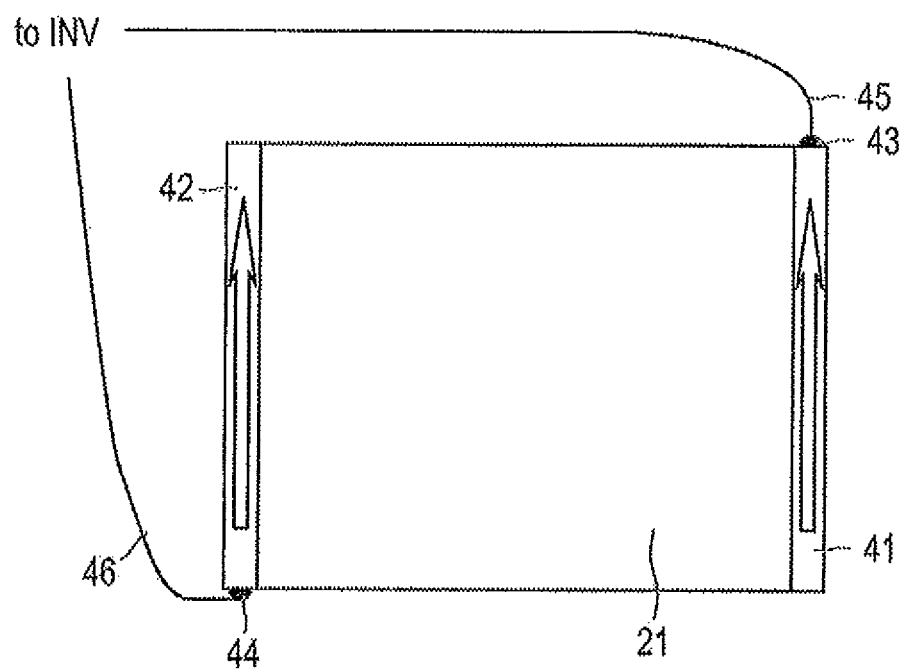
FIGS. 5A and 5B are conceptual diagrams showing the current and voltage distributions in the current collector plate.
Figure 5B:
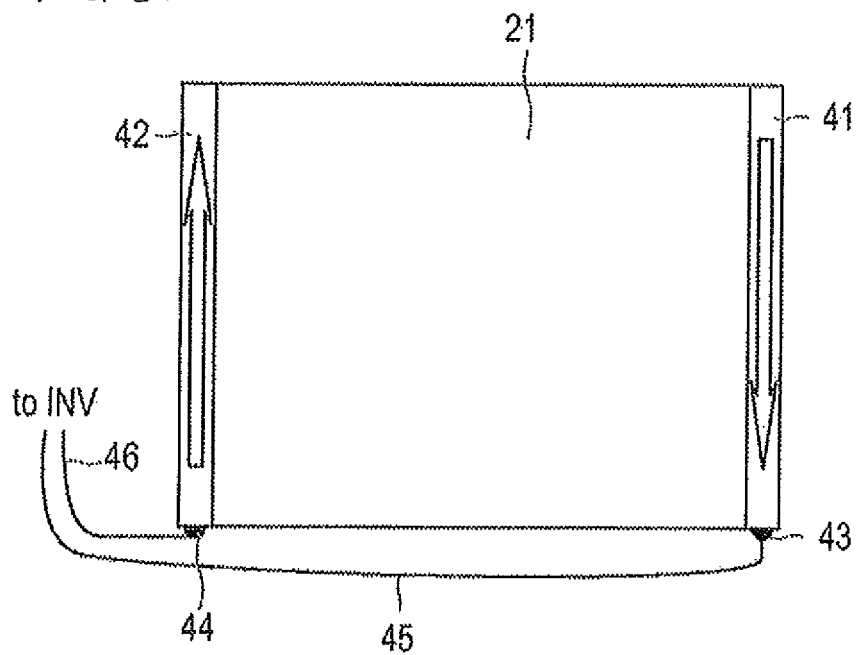
Figure 6:
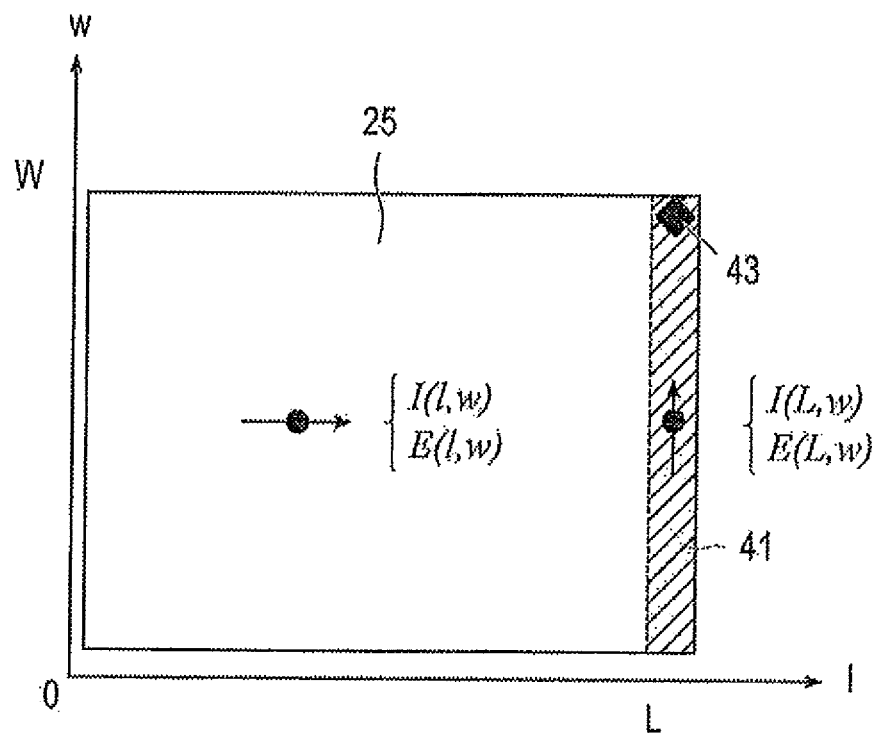
FIG. 6. Is a conceptual diagram showing the current path length and a surface current distribution at the current collector plate and bar.

FIG. 4 is a schematic diagram showing the current path length of the current that penetrate the power generating element 21. FIG. 5 is a drawing showing variable positions of terminals. FIG. 6 is a schematic diagram showing the current path in the current collector and bar as well as a surface current distribution in the current collector plate when the position of the terminal for retrieving current has been changed.

The power generating element 21 is subjected to be charger or discharged and electricity will be charged or discharged via the current collector plates 25, 27 electrically in surface contact with power generating element 21 and via a bar that is placed on an edge of the side of the current collector plates 25, 27, terminals 43, 44 provided at end portions of bars 41, 42, and finally through conductive lines 45, 46. Explanations will be made below assuming that the power generating element 21 is of a rectangular shape, but the shape is not a limitation.

Figure 4A:
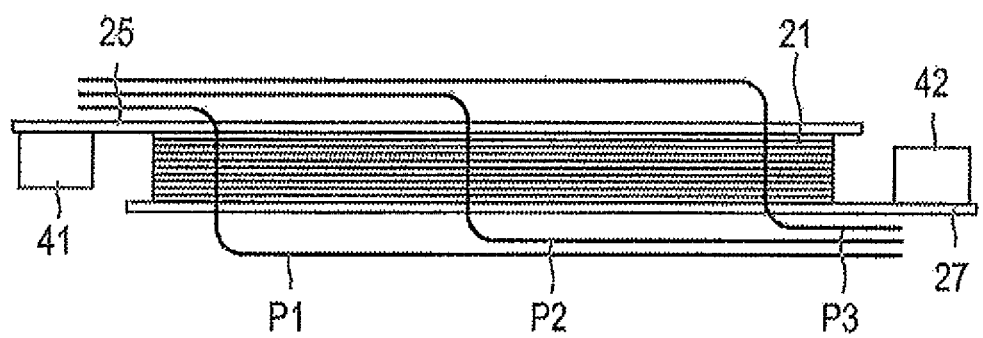
FIGS. 4A and 4B are conceptual diagrams showing the current path length to penetrate the power generating element.
Figure 4B:
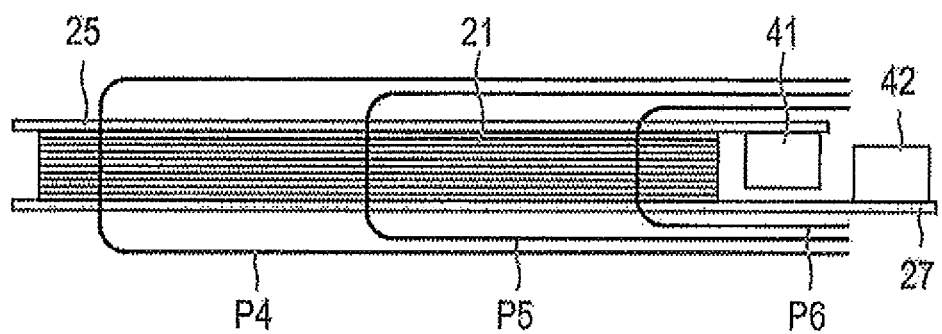

As shown in FIG. 4, current flows into bar 42 and penetrates the power generating element 21 and finally flows outside through terminal of bar 41. Here, referring to FIGS. 4A and 4B, locations of bars 41 and 42 are respectively explained. In FIG. 4A, bars 41 and 42 are placed symmetrically with the power generator element 21 as a symmetric center. In FIG. 4B, bars 41 and 42 are located on the same side with respect to the power generating element 21. Regarding a current flow path, for example, in FIG. 4A, current paths P1, P2 and P3 are present while there are paths P4, P5, P6 in FIG. 4B. As shown in FIG. 4A, if current is taken with bars located on the opposite position from each other, the pathways P1, P2, P3 are of the same length, and thus a load will be applied evenly on power generating element 21. In contrast, as shown in FIG. 4B, if current will be taken out with bars 41 and 42 located on the same side of power generating element 21, relative path way lengths of P4, P5, and P6 will be measured as in a formula, P4>P5>P6, so that a load will not be applied equally to the power generating element. In other words, regardless of the current path, when the path length is the same, the voltage nonuniformity will be eliminated because current will be transmitted to the equivalent electricity resistance irrespective the path of current within the power generating element 21. Therefore, it is preferable, as shown in FIG. 4A, to place bars 41, 42 symmetrically with the power generating element 21 as a center. This reason for this is because the arrangement of FIG. 4A will reduce a voltage gradient as compared to that illustrated in FIG. 4B. Here, it should be noted that both bars 41, 42 have a width not less than a half of the width of end edges of the first current collector plate 25 and the second current collector plate 27. Therefore, no voltage gradient will be present along the direction orthogonal to the present sheet. Therefore, both arrangements in FIGS. 4A and 4B are advantageous in this respect.

Now, explanations will be made regarding variations in the position of terminal with respect to bars 41 and 42. As shown in FIG. 5, a current passes through bar 42 and the power generating element 21 and flows through terminal of bar 41 out to an external inverter (INV) and the like. Here, in FIG. 5A and FIG. 5B, locations of the bars 41 and 42 will be explained. In FIG. 5A, the placement of terminals 43 and 44 on the bar 41 and 42 are respectively symmetrical. In FIG. 5B, terminals 43 and 44 on the bar 41 and 42 are located at the ends in the same direction. In both cases depicted in FIG. 5A and FIG. 5B, due to the bars 41 and 42 having a width that is not less than a half of the width of the end edges of the first and second collector plates 25, 27, no voltage gradient is present. In the configurations in FIG. 5B, conductive lines 45, 46 are pulled out on the same side, contrary to a diagonal location of terminals 43, 44 in FIG. 5A. Thus, the configurations in FIG. 5B assure ease of manufacturing.

The following describes potential difference between both ends of the bars 41 and 42. A distribution of current/voltage of the current collector plate and bar can be represented by the following formula. Here, j denotes the current density, [A/m2] and takes a constant value, ρ denotes resistivity [Ω·m], A denotes a cross section of the bar [m2], t denotes the thickness of current collector plate [m], and L x W denote the size of the current collector plate [m], respectively.

As shown in FIG. 6, when two coordinate axis defined by I-axis and W-axis, are applied with respect to the current collector plate 25, the current distribution at a given distance w and parallel to the I-axis can be expressed in Equation 1.

$$\int_0^L j \cdot dw dl = jLdw \quad \text{[Equation 1]}$$

Here, for sake of simplicity, it is assumed that the voltage difference depending only on w is not present.

Thus, the current at the end of the current collector plate 25 at which the bar 41 is in contact with is calculated to be jLdw, and the current distribution along the bar 41 can be expressed in Equation 2.

$$I(L,w) = jLw \quad \text{[Equation 2]}$$

Meanwhile, the voltage distribution along the bar 41 can be expressed in Equation 3 based on the above current distribution and properties of the bar 41.

$$E(w) = j\frac{\rho L w^2}{2A} \quad \text{[Equation 3]}$$

In other words, the potential difference between both longitudinal ends, $\Delta E_{max}$ can be expressed in Equation 4.

$$\Delta E_{max} = j\frac{\rho L W^2}{2A} \quad \text{[Equation 4]}$$

The total current I flowing in and out of the bipolar secondary battery can be expressed in Equation 5, so that the potential difference $\Delta E_{max}$ of Equation 4 can be rewritten as Equation 6.

$$I = jLW \quad \text{[Equation 5]}$$

$$\Delta E_{max} = \rho I \frac{W}{2A} \quad \text{[Equation 6]}$$

In order to minimize the $\Delta E_{max}$, W may be reduced. In other words, when designing the power elements of the same area, it is effective when L may be set greater, or cross section of the bar 41, A may take a large value.

Thus, according to the bipolar secondary battery 10 in the first embodiment, the bars 41 and 42 comprise a suitable cross sectional area while being disposed over the entire length of one edge of the current collector plate and positioned opposed to each other with a power generator element placed there between. Because of these configurations, electrical resistance may be decreased and current can be collected to the bars uniformly. In addition, irrespective of the current path through a plane vertical to any location of the electrode surface an overall uniformity in the electrical resistance between its two poles may be assured with the result of even more uniform potential distribution. Therefore, because current can be collected uniformly across the bars 41 and 42 from the entire current collector plates 25, 27, a substantial current concentration would not occur. Therefore, abrupt changes in voltage may be suppressed to a minimum, and the deterioration rate of the electrodes will be delayed with an improved battery life.

In particular, by securing a cross-sectional area of the bar more than 0.04% as compared to the electrode area, it is possible to achieve the desired control accuracy of the non-aqueous secondary battery used as a power source for an electrically driven vehicle.

Here, when bars 41 and 42 are provided with a width of more than half the width of end edges of the first and the second current collector plates 25, 27, both a uniform potential distribution and a delayed rate of deterioration of electrode will be assured.

Moreover, the bars 41 and 42 are configured to protrude from the first and the second current collector plates 25, 27 to the side of the power generating element 21 (i.e., inside direction). Thus, the arrangements are space-efficient and bars 41 and 42 are stored within the height of the power generating element 21.

In addition, the terminals 43 and 44 each being attached to bars 41 and 42, respectively, are further attached to conductive lines or wires 45 and 46. The conductive lines or wires 45 and 46 will ensure easy sealing when they are pulled out of the battery package 29, shown in FIG. 3, due to the wire configuration.

Figure 7:
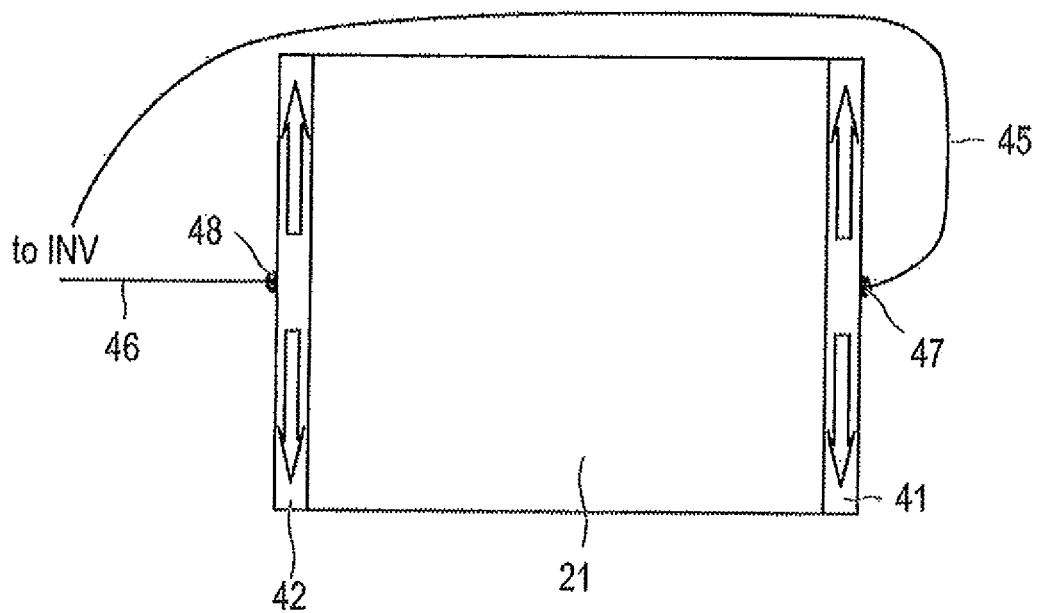
FIG. 7 is a conceptual diagram showing the current path length and a surface current distribution at the current collector plate and bar according to a second embodiment of the invention.

A bipolar secondary battery 10 of the second embodiment is different from that of the first embodiment in the position of a terminal for retrieving current. More specifically, as shown in FIG. 7, in the second embodiment, terminals 47 and 48 are positioned at the midpoint of the first bar 41 and at the midpoint of the second bar 42, respectively.

By positioning terminal 47, 48 at the midpoints of the first bar 41 and second bar 42, respectively, power may be retrieved via conductive lines 45, 46, power line, wire, or bus bar, or leads from the center of the bar, i.e., from the center line of the power generating element 21. In this case, $\Delta E_{max}$ of Equation 6 can be recalculated by replacing the dimension W with W/2. Because $\Delta E_{max}$ is a tolerance value uniquely defined, when the value is assumed to be unchanged though the above replacement, the cross-sectional area of the bar may be reduced to be a/2, so that substantial decrease in volume, mass, and cost may be achieved.

Thus, according to the bipolar secondary battery 10 in the second embodiment, in addition to the effects of the first embodiment, additional technical advantages are achieved such as a reduction of the maximum length of current path along the edges to minimize the cross-section of the bar, which is defined on the basis of both the tolerated potential difference and desired working current.

Finally, the type of batteries to which the present invention may be applied is not particularly limited, but applicable, for example, to a non-aqueous electrolyte battery. Also, the non-aqueous electrolyte battery, if classified in terms of structure and form, is not particularly confined to a stacked (flat type) battery and winding type (cylindrical type), but any known structure is equally applicable.

Similarly, when the non-aqueous electrolyte battery is classified in the type of electrolyte, no specific limitations will be posed. For example, the present invention is equally applicable to any of a liquid electrolyte battery in which non-aqueous electrolyte liquid is impregnated in a separator, a so-called polymer battery such as a high polymer gel electrolyte battery and a solid polymer electrolyte (full solid electrolyte) battery. The high polymer gel electrolyte and/or solid polymer electrolyte may be used alone or in combination in which the high polymer gel electrolyte or solid polymer electrolyte may be impregnated in a separator.

Moreover, in view of electrode materials or metallic ions that move across associated electrodes, the present invention may not be restrictive, but is applicable to any known type of electrode materials and the like, such as, for example to a lithium ion secondary battery, a sodium ion secondary battery, a potassium ion secondary battery, a nickel-hydrogen secondary battery, and a nickel-cadmium secondary battery. Preferably, the present invention may have application to the lithium ion secondary battery when used as a main or auxiliary resource for vehicle because of its high voltage performance per unit cell (unit battery cell layer), high energy density, and high power output density attributable to a lithium ion secondary battery.

When a winding type (cylindrical type) battery is involved, a bipolar electrode may be wound about a bar of one side to configure a spiral shaped cross section to obtain a similar effect.

Furthermore, the present invention may also be applied to a primary battery which can discharge only, not necessarily to a rechargeable secondary battery. The reason for that is because when retrieving current, the primary battery operates in the same manner as in the embodiment described above.

Although in the above first and second embodiments, explanations are made for using a bar of bar or rod shape 41, 42, the present invention is not limited to this specific structure or form. As long as a convex part is used which protrudes toward the side of power generating element 21 and it has a width which is not less than a half width of the end edge of the current collector plates 25, 27, the bar-shaped configuration is not required but other structures may be used instead of bars 41, 42.

In addition, in the above embodiments 1 and 2, explanations are made for the case in which bars 41, 42 are provided on the associated current collector plates, i.e. on both the first current collector plate 25 and the second current collector plate 27, respectively. But the present invention is not limited to this specific arrangement. At a minimum, by providing the above-described bar (convex part) at least on one of the current collector plates, the effect of reducing a voltage gradient will be obtained. Apparently, when provided on both current collectors, more reduction in voltage gradient will be expected.

The invention claimed is:

1. A battery, comprising:
a power generating element composed by stacking a plurality of unit battery cell layers, each unit battery cell layer composed by sequentially stacking a positive electrode, an electrolyte, and a negative electrode;
a first current collector plate provided on an outer surface of one of the two outermost unit battery cell layers of the power generating element;
a second current collector plate provided on an outer surface of another of the two outermost unit battery cell layers of the power generating element;
a first conductive convex portion formed on one of the first and second current collector plates;
a terminal attached to the first conductive convex portion configured to retrieve current from the first conductive convex portion, the terminal spaced from the one of the first and second current collector plates;
a conductive line connected to the terminal; and
an exterior package housing the power generating element, wherein the first conductive convex portion and terminal are provided entirely within an interior of the exterior package, with the conductive line extending exterior to the exterior package housing.

2. The battery according to claim 1, wherein the terminal is attached to an end of the first convex portion.

3. The battery according to claim 1, wherein the first convex portion has a same width of that of a respective first and second current collector plate on which the first convex portion is formed.

4. The battery according to claim 1, wherein the first convex portion is formed at a location spaced from a side of the power generating element.

5. The battery according to claim 1, wherein a cross sectional area of the first convex portion in a plane perpendicular to an elongate axis of the first convex portion is not less than 0.04% of a surface area of the positive electrode or the negative electrode.

6. The battery according to claim 1 further comprising a second conductive convex portion formed on another of the first and second current collector plates.

7. The battery according to claim 6, wherein the first convex portion formed on the first current collector plate and the second convex portion formed on the second current collector plate are positioned on opposing faces of the first and second current collector plates.

8. The battery according to claim 7, wherein the first convex portion and the second convex portion are further positioned on a same side of the power generating element such that the first convex portion and the second convex portion face each other.

9. The battery according to claim 6, wherein the first convex portion formed on the first current collector plate and the second convex portion formed on the second current collector plate are positioned on a same side of the of the power generating element, such that the power generating element only has the first convex portion and the second convex portion on the same side.

10. The battery according to claim 6 further comprising a terminal attached to an end of the second convex portion formed on the other of the first and second current collector plates.

11. A battery comprising:
a power generating element composed by stacking a plurality of unit battery cell layers, each unit battery cell layer composed by sequentially stacking a positive electrode, an electrolyte, and a negative electrode;
a first current collector plate provided on an outer surface of one of two outermost unit battery cell layers of the power generating element;
a second current collector plate provided on an outer surface of another of the two outermost unit battery cell layers of the power generating element;
a first conductive convex portion formed on a face of the first current collector plate in contact with one of the outermost unit battery cell layers;
a second conductive convex portion formed on an opposing face of the second current collector plate in contact with another of the outermost unit battery cell layers;
a first terminal attached to the first conductive convex portion configured to retrieve current from the first conductive convex portion, the first terminal spaced from the first current collector plate;
a second terminal attached to the second conductive convex portion configured to retrieve current from the second conductive convex portion, the second terminal spaced from the second current collector plate; and
an exterior package housing the power generating element, wherein the first conductive convex portion and the second conductive convex portion are provided exterior of the exterior package.

12. The battery according to claim 11, wherein the first convex portion formed in the first current collector plate and the second convex portion formed in the second current collector plate are positioned on opposite sides of an axis parallel to a stacking direction with the power generating element as a center between the first convex portion and the second convex portion.

13. The battery according to claim 11, wherein the first terminal is attached to an end of the first convex portion and the second terminal is attached to an end of the second convex portion.

14. The battery according to claim 11, wherein the first convex portion has a same width of that of the first current collector plate and the second convex portion has a same width of that of the second current collector plate.

15. The battery according to claim 11, wherein the first convex portion and the second convex portion are formed at locations spaced from a side of the power generating element.

16. The battery according to claim 11, wherein a cross sectional area of each of the first and second convex portions in a plane perpendicular to an elongate axis of the convex portion is not less than 0.04% of a surface area of the positive electrode or the negative electrode.

17. The battery according to claim 11, wherein the first convex portion formed in the first current collector plate and the second convex portion formed in the second current collector plate are positioned on a same side of the of the power generating element, such that the power generating element only has the first convex portion and the second convex portion on the same side.

* * * * *